(12) United States Patent
Hagen

(10) Patent No.: US 7,318,008 B2
(45) Date of Patent: Jan. 8, 2008

(54) METHOD AND SYSTEM FOR ESTIMATING SPARE PARTS COSTS

(75) Inventor: William Hagen, Taylor, MI (US)

(73) Assignee: Ford Motor Company, Dearborn, MI (US)

( * ) Notice: Subject to any disclaimer, the term of this patent is extended or adjusted under 35 U.S.C. 154(b) by 6 days.

(21) Appl. No.: 11/276,418

(22) Filed: Feb. 28, 2006

(65) Prior Publication Data

US 2007/0203857 A1    Aug. 30, 2007

(51) Int. Cl.
G06F 15/00 (2006.01)
G06F 17/00 (2006.01)

(52) U.S. Cl. ..................... 702/184; 705/400

(58) Field of Classification Search ......... 702/184, 702/84, 179, 181; 705/22, 28, 29, 1, 7–8, 705/400; 703/2, 22; 701/29; 714/1, 47; 700/90, 106
See application file for complete search history.

(56) References Cited

U.S. PATENT DOCUMENTS

| 6,226,597 B1 * | 5/2001 | Eastman et al. ............. 702/34 |
| 6,247,145 B1 | 6/2001 | Witteried |
| 6,278,920 B1 | 8/2001 | Hebberd |
| 6,571,202 B1 | 5/2003 | Loman et al. |
| 6,684,349 B2 * | 1/2004 | Gullo et al. .................. 714/47 |
| 6,799,154 B1 * | 9/2004 | Aragones et al. ............. 703/22 |
| 6,816,798 B2 | 11/2004 | Pena-Nieves et al. |
| 6,832,205 B1 * | 12/2004 | Aragones et al. ............. 705/10 |
| 6,950,781 B2 | 9/2005 | Gomez et al. |
| 7,082,384 B2 * | 7/2006 | Sasaki et al. ............... 702/184 |
| 7,143,007 B2 * | 11/2006 | Long et al. ................. 702/184 |
| 2003/0055753 A1 * | 3/2003 | Dellar et al. ................. 705/29 |
| 2004/0123179 A1 * | 6/2004 | Dragomir-Daescu et al. .. 714/1 |

OTHER PUBLICATIONS

Jiang, Z., A Reliability Model for Systems Undergoing Remanufacture, Thesis for Degree of Master of Applied Science, Department of Mechanical and Industrial Engineering, University of Toronto, 1999.*
Marquez et al., Models for Maintenance Optimization: A Stdy for Repairable Systems and Finite Time Period, 2002, Reliability Engineering and System Safety 75, pp. 367-377.*
Nachlas et al., Sensitivity in Weibull System Reliability Models, 1984, Reliability and Maintainability Annual Symposium Proceedings, pp. 428-433.*
Jiang et al., Reliability Analysis of Non-Constant-Size Part Populations in Design for Remanufacture, 2000, Transactions of the ASME, vol. 122, pp. 172-178.*

\* cited by examiner

Primary Examiner—John Barlow
Assistant Examiner—Toan M. Le
(74) Attorney, Agent, or Firm—Raymond L. Coppiellie; Brooks Kushman P.C.

(57) ABSTRACT

According to one embodiment of the present invention, an electronic method for estimating a quantity of spare parts needed for a machine is disclosed. The machine includes a number of replaceable part populations. The method includes receiving (1) life data for a number of part populations in the machine and (2) a duration for the life cycle of the machine. The method further includes calculating a failure distribution according to a failure distribution model for each of the number of part populations based on the life data and calculating an estimated replacement part quantity for each of the number of part populations for one or more time intervals in the duration based on the failure distribution.

15 Claims, 4 Drawing Sheets

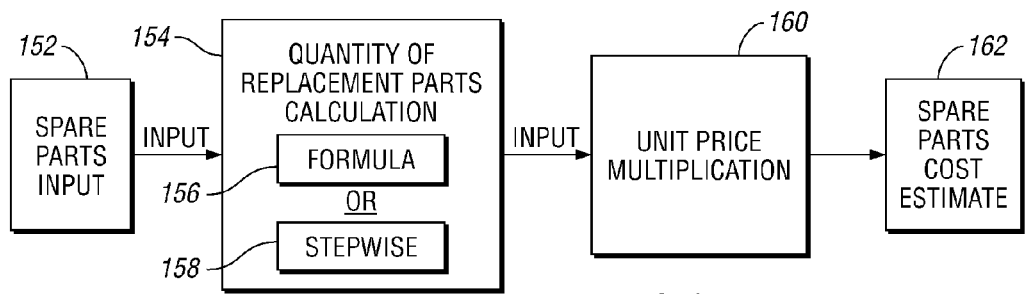
*Fig. 3*
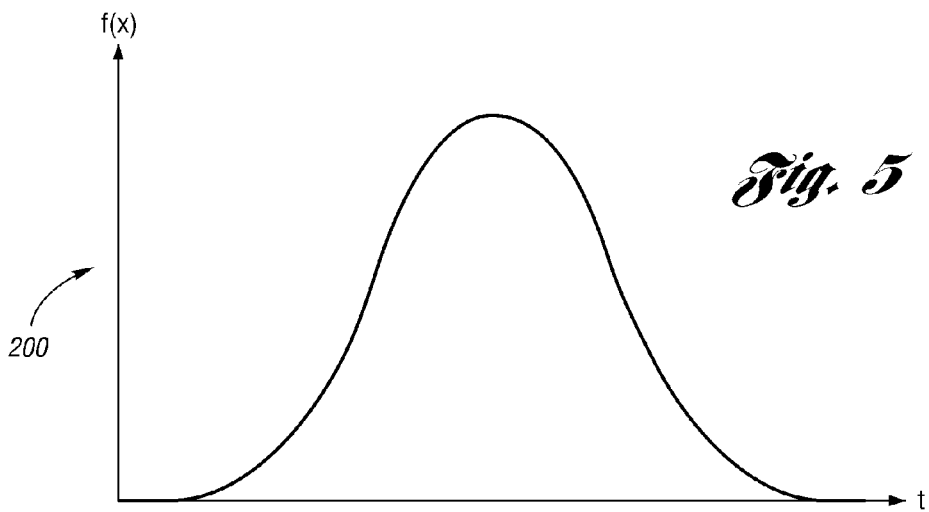
*Fig. 4*
*Fig. 5*

Fig. 7

| OPERATING COSTS/YEAR | 1 | 2 | ... | n | TOTAL |
|---|---|---|---|---|---|
| TOOLING | | | ... | | |
| MAINTENANCE MATERIALS | | | ... | | |
| SUPPLIES | | | ... | | |
| SCRAP | | 320 | ... | | |
| UTILITIES & FUEL | | | ... | | |
| SUNDRY | | | ... | | |
| PROVISION | | | ... | | |
| TOTAL | | | ... | | |

302 TOOLING
304 MAINTENANCE MATERIALS
306 SUPPLIES
308 SCRAP
310 UTILITIES & FUEL
312 SUNDRY
314 PROVISION
316 TOTAL
318 (columns 1, 2, ..., n)
300

Fig. 6

- 252 ACQUISITION COST
- 254 OPERATING COSTS
  - TOOLING
  - BULK CONSUMABLES
  - UTILITIES
  - WASTE HANDLING
  - FLOOR SPACE
- 256 MAINTENANCE COSTS
  - PM MATERIAL
  - PM LABOR
  - MINOR LABOR
  - MAJOR REPAIR MAINTENANCE LABOR
  - SPARE PARTS
- 258 TURNOVER/SCRAP
- 260 TOTAL COST

250

METHOD AND SYSTEM FOR ESTIMATING SPARE PARTS COSTS

BACKGROUND OF THE INVENTION

1. Field of the Invention

One aspect of the present invention generally relates to a method and system for estimating spare parts costs, and in certain aspects, a method and system for estimating spare parts costs of a machine.

2. Background Art

The process of manufacturing products typically involves the use of machines, which usually include a multitude of components, otherwise referred to as parts. Many of these parts can be repaired and/or replaced several times during the life cycle of the machine. For instance, many mechanical and chemical parts need to be repaired and/or replaced as they are susceptible to wear out, failure and/or aging. Manufacturers and/or suppliers often procure and inventory spare parts so that the failed or aged part can be replaced in a timely and efficient manner.

Estimating the number of replacement parts that are needed during the life cycle of a machine is critical to the cost-efficient procurement and inventory of spare parts, as well as other business objectives. Manufacturers and suppliers typically perform estimates on costs associated with the life cycle of machines, which are otherwise referred to as reliability and maintainability life cycle costs (LCC). However, these cost estimates often do not include a calculation of estimated spare parts needed. When the estimated LCC includes a spare parts estimate, the spare parts estimate may be incomplete and/or inaccurate, especially if the machine is based on relatively new technology in which reliability data on some of the replacement parts is scarce or unknown.

Without accurate and complete spare part usage estimates, a significant difference in actual and expected life cycle costs may arise. This discrepancy may cause a number of business problems, including, but not limited to, inefficient use of resources, lack of funds for necessary spares and maintenance, and negative effects on profitability of the manufacturing process.

Moreover, inaccurate estimates of life cycle costs can impair business decisions regarding the acquisition of machines. Acquisition decisions are typically made by taking into account the life cycle costs in addition to the acquisition price. Often, tradeoffs are made between the acquisition costs and the long term operating costs. In order to effectively make these tradeoffs to arrive at a sound business decision, the life cycle costs, which include the long term operating costs, must have a relatively high level of accuracy.

While life cycle cost models have been proposed and implemented on computer systems, these systems do not adequately address the spare parts estimation issue. Many of the systems do not address spare parts cost estimation at all. Moreover, these models are very complicated, requiring a sizable amount of input and computing power. For instance, many life cycle models have been implemented on mainframe computers.

To the extent that some of these systems do address spare part usage estimates, the estimates are based on faulty assumptions. For instance, at least one system assumes that failure rates remain constant over time, which is typically not the case.

Instead, what is needed is the use of a failure distribution which produces more accurate spare part usage estimations. While failure distributions have been used to model the failure of single components, they have not been utilized in the calculation of machine life cycle costs.

In light of the foregoing, a method and system for estimating spare parts costs with failure distributions is needed. A method and system is also needed to estimate the life cycle costs of a machine having a number of parts replaceable by spare parts.

SUMMARY OF THE INVENTION

One aspect of the present invention is a method and system for estimating spare parts costs with failure distributions. Another aspect of the present invention is a method and system for estimating life cycle costs of a machine having a number of parts replaceable by spare parts.

According to one embodiment of the present invention, an electronic method for estimating a quantity of spare parts needed for a machine is disclosed. The machine can include a number of replaceable part populations. The method includes receiving (1) life data for a number of part populations in the machine and (2) a duration for the life cycle of the machine. Each of the number of part populations has a corresponding spare part for replacement. The method further includes calculating a failure distribution according to a failure distribution model for each of the number of part populations based on the life data and calculating an estimated replacement part quantity for each of the number of part populations for one or more time intervals in the duration based on the failure distribution. The method can further include the use of a Weibull model as the failure distribution model. The life data can include beta, eta, and/or gamma. Non-limiting examples of Weibull models include one-parameter, two-parameter and three-parameter Weibull models. Moreover, the Weibull model can be exponential, logarithmic, log normal or normal. The Weibull model can be a formula or stepwise Weibull model.

In certain embodiments, the method can further include receiving a unit price for each of the corresponding spare parts and calculating an estimated spare parts cost for one or more time intervals in a duration based on the estimated replacement part quantities and the unit price for the corresponding spare parts for each of the number of part populations. In certain embodiments, the duration can be 10 (ten) years.

In another embodiment of the present invention, an electronic method for estimating life cycle costs of a machine is disclosed. The machine can include a number of replaceable part populations. Each of the number of part populations has a corresponding spare part for replacement. The method includes receiving (1) life data for a number of part populations of a machine, (2) a unit price for each of the corresponding spare parts and (3) a duration for the life cycle of a machine. The method further includes calculating a failure distribution for each of the number of part populations based on the life data, calculating an estimated replacement part quantity for each of the number of part populations for one or more intervals in a duration based on the failure distribution, calculating an estimated spare parts cost for the one or more intervals of the duration based on the estimated replacement part quantities and the unit price for the corresponding spare part for each of the number of part populations, and calculating an estimated life cycle cost for the machine based partially on the estimated spare parts cost. The method can further include calculating an overhead budget estimation based partially on the estimated spare parts cost. The failure distribution model can be a Weibull model.

In yet another embodiment of the present invention, a computer system is disclosed which includes a computer having a central processing unit (CPU) for executing machine instructions in a memory for storing machine instructions that are to be executed by the CPU. The system is suitable for calculating estimated spare parts costs of a machine having a number of replaceable part populations. Each of the number of spare part populations has a corresponding spare part for replacement. The machine instructions when executed by the CPU implement the following functioning: receiving (1) life data for a number of spare part populations of a machine, (2) a unit price for each of the corresponding spare parts and (3) a duration for the life cycle of a machine. The machine instructions further execute calculating a failure distribution according to a failure distribution model for each of the number of part populations based on the life data, calculating an estimated replacement part quantity for each of the number of part populations for one or more time intervals in the duration based on the failure distribution and calculating an estimated spare parts cost for one or more intervals in a duration based on the estimated replacement part quantity and the unit price for the corresponding spare part for each of the number of part populations. The failure distribution model can be a Weibull model and the life data can include beta, eta, and/or gamma. The Weibull model can be a one-parameter, two-parameter or three-parameter Weibull model. The Weibull model can be exponential, logarithmic, log normal or normal. The Weibull model can be a formula or a stepwise Weibull model.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings which:

FIG. 3 is a graphical user interface for inputting and displaying spare part information according to one embodiment of the present invention;

FIG. 4 is a flowchart depicting the steps of a method for estimating spare part cost according to one embodiment of the present invention;

FIG. 5 is a graph depicting a 3-parameter Weibull distribution according to one embodiment of the present invention;

FIG. 6 is a fragment of an electronic form for displaying an estimated life cycle costs sheet according to one embodiment of the present invention; and FIG. 7 is a fragment of an electronic form for displaying an overhead budget an estimated overhead costs sheet according to one embodiment of the present invention.

DETAILED DESCRIPTION OF EMBODIMENTS OF THE PRESENT INVENTION

Figure 1:
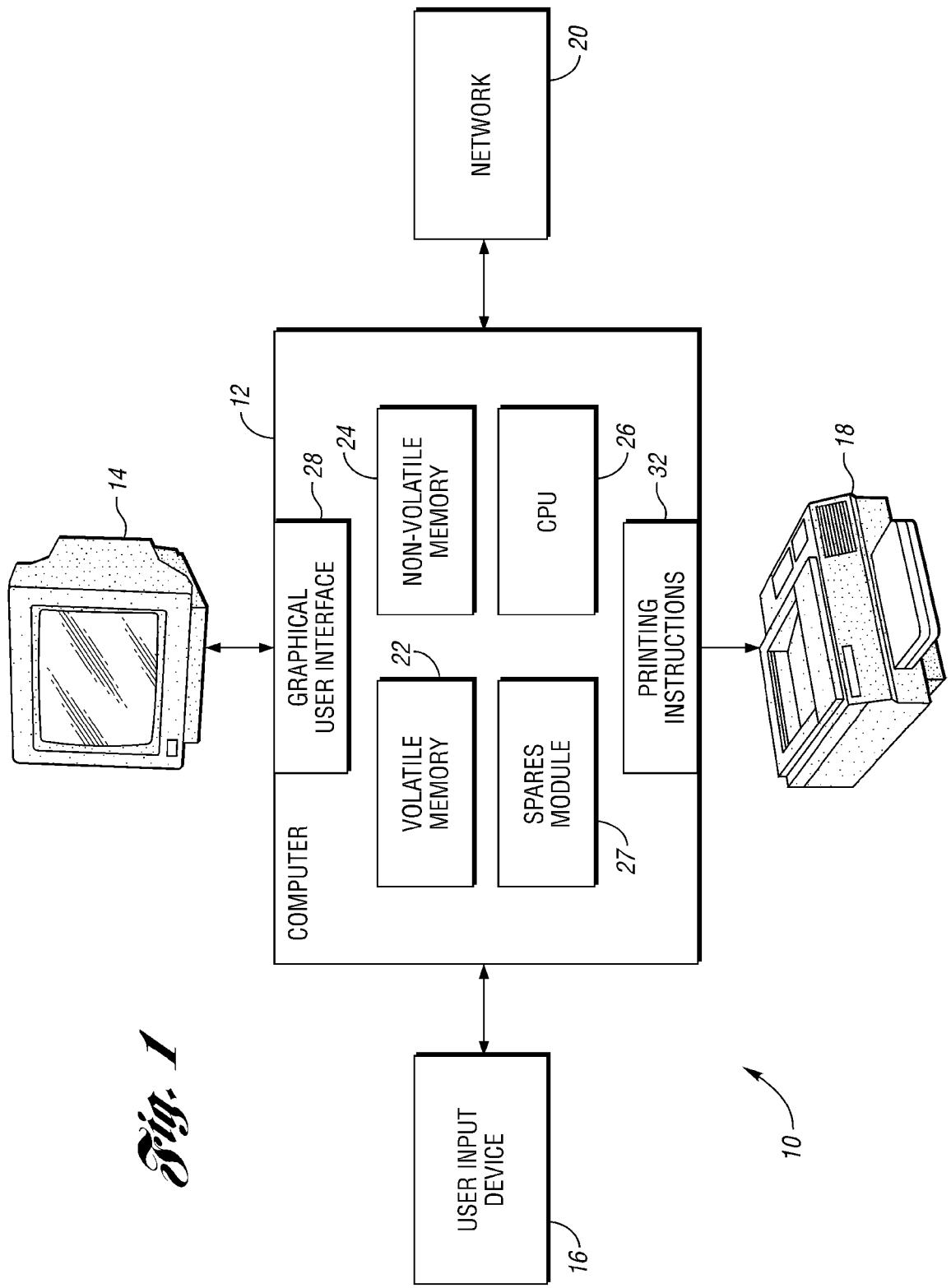
FIG. 1 is a schematic diagram illustrating a computer system for implementing one or more embodiments of the present invention.

FIG. 1 depicts an environment, i.e. computer system 10, suitable for implementing one or more embodiments of the present invention. Computer system 10 includes computer 12, display 14, user input device 16, printer 18 and network 20.

Computer 12 includes volatile memory 22, non-volatile memory 24, central processing unit (CPU) 26, and spares module 27. Non-limiting examples of non-volatile memory include hard drives, floppy drives, CD and DVD drives, and flash memory, whether internal, external, or removable. A database can reside in non-volatile memory 24. The database may also reside on a separate computer, e.g. a server computer, accessible through the network 20. Volatile memory 22 and/or non-volatile memory 24 can be configured to store machine instructions. CPU 26 can be configured to execute machine instructions to implement functions of the present invention, for example, estimating life cycle costs, and, more particularly, spare parts costs.

Display 14 can be utilized by the user of the computer 12 to input, view, edit, and modify data relating to the estimation of life cycle costs and associated costs, such as spare parts costs. Non-limiting examples of users of computer 12 include manufacturers and suppliers that supply products and services to the manufacturers. Another non-limiting example of a user is a machine builder. A non-limiting example of display 14 is a color display, e.g. a liquid crystal display (LCD) monitor or cathode ray tube (CRT) monitor. A graphical user interface 28 can be generated by computer 12 and displayed on display 14 to facilitate the input of data. It should be appreciated that display 14 can also display reports of estimated life cycle costs and any associated cost breakdowns.

The user input device 16 can be utilized by a user to input instructions to be received by computer 12. The user input device 16 can be a keyboard having a number of input keys, a mouse having one or more mouse buttons, a touchpad or a trackball or combinations thereof. In certain embodiments, the mouse has a left mouse button and a right mouse button. It will be appreciated that the display 14 and user input device 16 can be the same device, for example, a touch-sensitive screen.

Computer 12 can be configured to be interconnected to network 20, through two-way communication line 30, for example, a local area network (LAN) or wide area network (WAN), through a variety of interfaces, including, but not limited to dial-in connections, cable modems, high-speed lines, and hybrids thereof. Firewalls can be connected in the communication path to protect certain parts of the network from hostile and/or unauthorized use.

Computer 12 can support TCP/IP protocol which has input and access capabilities via two-way communication line 30. The communication lines can be an intranet-adaptable communication line, for example, a dedicated line, a satellite link, an Ethernet link, a public telephone network, a private telephone network, and hybrids thereof. The communication lines can also be intranet-adaptable. Examples of suitable communication lines include, but are not limited to, public telephone networks, public cable networks, and hybrids thereof.

Computer 12 can be configured to generate printing instructions 32 for transmission to printer 18. Printer 18 can be utilized to print reports of estimated life cycle costs and associated cost reports, such as reports of spare parts costs or overhead costs.

In at least one embodiment of the present invention, a method and system is disclosed for estimating life cycle costs, including spare parts costs, of machines used in manufacturing enterprises to produce products. Certain embodiments of the present invention are applicable to automobile manufacturing enterprises, while these and other embodiments can also be applied to other manufacturing enterprises, such as manufacturing enterprises aircraft, spacecraft and/or submarines. Non-limiting examples of machines used in automobile manufacturing include metal cutting transfer machines, cylinder head lines, and engine lines.

Figure 2:
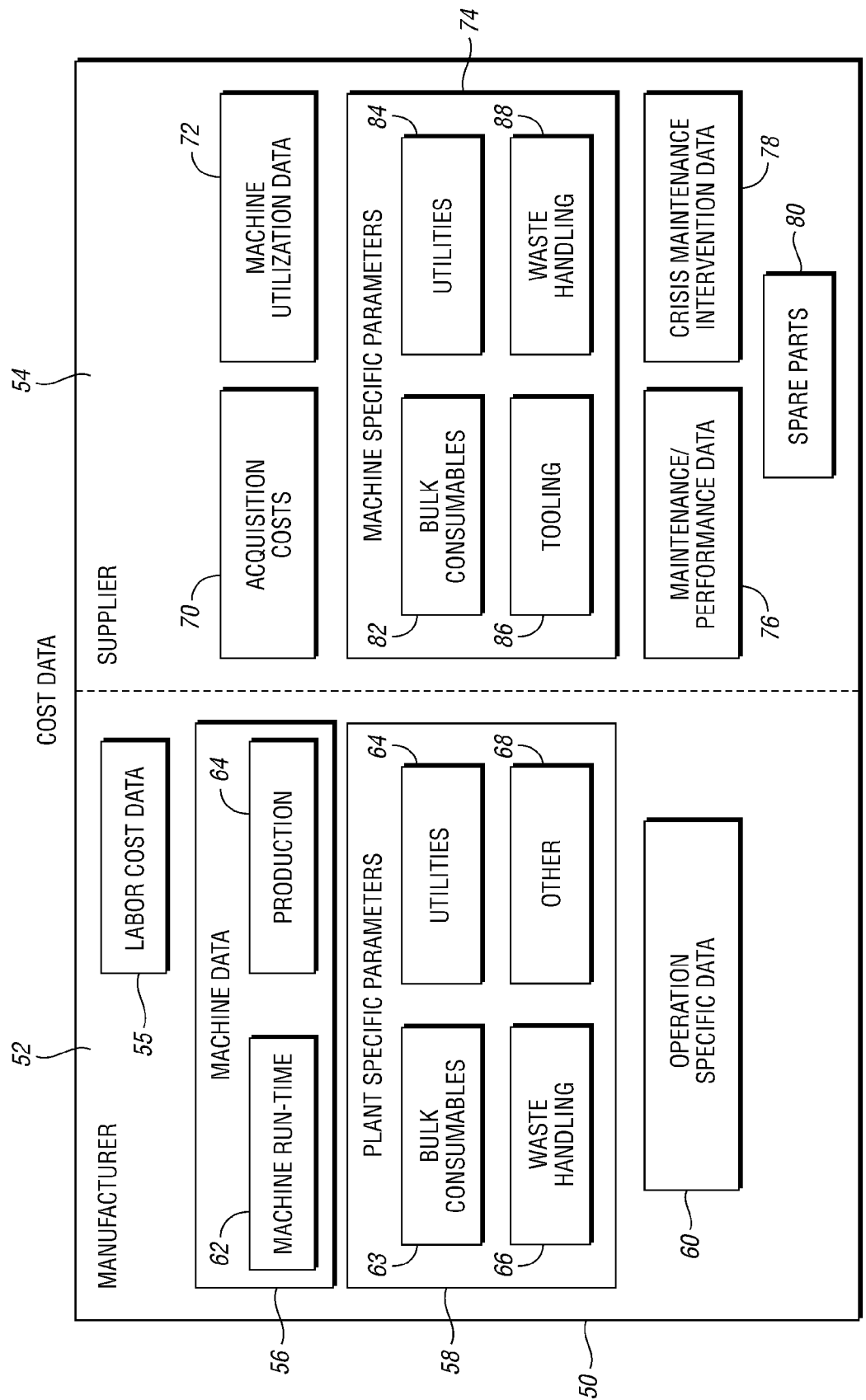
FIG. 2 is a block diagram illustrating a number of inputs for use in a life cycle costs estimation according to one embodiment of the present invention.

In at least one embodiment, the estimation method and system include receiving life cycle cost data as input for the life cycle cost estimation calculation. FIG. 2 is a block diagram illustrating a number of inputs for use in a life cycle costs estimation according to one embodiment of the present invention. It should be appreciated that the cost data of FIG. 2 is merely exemplary of the data needed to estimate life cycle costs, and inputs can be added and deleted based on the specific calculation of an estimated life cycle costs.

According to FIG. 2, the cost data 50 is broken into two categories: manufacturer cost data 52 and supplier cost data 54. Manufacturer cost data 52 includes labor cost data 55, machine data 56, plant specific data 58, and operation specific data 60. In certain embodiments, the manufacturer inputs the manufacturer cost data 52 into computer system 10.

Labor cost data 55 can include number of operators (operators), skilled labor ($/hour), and operation labor ($/hour). Machine data can be further broken down into machine run-time data 62 and production data 64. Non-limiting examples of machine run-time data 62 include operating hours (hours/week), operating weeks (weeks/year), and total hours (hours/year). Non-limiting examples of production data includes capacity at 100% maximum cycle time, 100% MCT (seconds/cycle), customer demand (units/year), task time (seconds/cycle), and targeted production rate (units/hour). It should be appreciated that 100% MCT can refer to the machine running at its full capacity.

Plant specific data 58 can be broken down into bulk consumables costs 63, utilities 64, waste handling costs 66, and other costs 68. Non-limiting examples of bulk consumables costs 63 include coolant ($/gallon), filter media ($/yard), lubrication ($/gallon), hydraulic fluid ($/gallon), and miscellaneous consumables ($/unit). Non-limiting examples of utilities 64 include compressed air ($/1000 cubic feet), electricity ($/kW-hr), gas ($/cubic feet), steam consumption ($/1000 pounds), and water consumption ($/gallon). Non-limiting examples of waste handling costs 66 include metal working coolant dumping ($/gallon), filter media ($/yard), and sludge ($/cubic foot). Non-limiting examples of other costs 68 include floor value ($/square foot/year) and plant construction ($/square foot).

Operation specific data 60 can include tooling cost ($/year).

Supplier cost data 54 includes acquisition costs 70, machine utilization data 72, machine specific parameters 74, maintenance/performance data 76, crisis maintenance intervention data 78 and spare parts data 80.

Acquisition costs 70 include purchase price ($) administration costs ($), installation ($), training ($) shipping costs ($), warranty ($), and support equipment ($) Machine utilization data 72 includes floor space (square feet), turnover/scrap cost ($/unit), changeover/year (changes/year), and number of machines. In certain embodiments, one or more suppliers that supply products and services to the manufacturer are responsible for inputting the supplier cost data 54 into computer system 10.

Machine specific parameters 74 can be further broken down into bulk consumables costs 82, utilities 84, tooling costs 86, and waste handling costs 88. Tooling costs 86 can include average changeover time (minutes/change). Examples of costs 82, 84 and 88 follow costs 62, 64 and 66, respectively.

Non-limiting examples of maintenance/performance data 76 include operational mean time between events(MTBE) (hours/event), inherent mean time between failures (MTBF) (hours per failure), operational mean time to repair (MTTR$_o$), and inherent MTTR$_i$ (hours/repair). It should be appreciated that MTBE can refer to the average time between the machine dropping out of automatic operation and MTBF can refer to the average time between actual hard failures, e.g. adjustments or replacements. It should be further appreciated that MTTR$_o$ is used to calculate operational availability and MTTR$_i$ is used to calculate inherent availability. Crises maintenance intervention data 78 includes skilled trades per major repair (trades/repair).

It should be appreciated that the unit labels for each cost component can vary as long as the type of unit is maintained according to the above-identified labels. As a general example, the units can be in English units, e.g. pounds, foot and gallon, or in metric units, e.g. meter, kilogram and liter. Additionally, any currency can be substituted for dollars($), e.g. pounds (£) or Euros (€).

In certain embodiments, suppliers input spare parts data 80 through spares module 27 of computer 10. In particular, spares module 27 can generate computer instructions in the form of a graphical user interface (GUI) 28 for display on display 14. One exemplary GUI 28 is depicted as electronic form 100 of FIG. 3. Electronic form 100 is otherwise referred to as spare parts list 100. Spare parts list 100 can include areas to input spare parts data and areas to output information based at least partially on calculations involving the spare parts input data. For example, the output data can include estimates of replacement parts needed, spare parts budgets, and/or reordering data.

As depicted in FIG. 3, spare parts list 100 includes item number column 102 for inputting an item number for each type of spare part population, a unit price column 104 for inputting a unit price for the spare part, and one or more columns 106 for life data for the spare part population (otherwise referred to as life data columns). A non-limiting example of a type of spare part population is a quantity of a specific type of part used on a machine, e.g. a certain kind of switch, sensor, bearing or motor. When the machine is first put into service, each part in the population will be of the same age. Over time, with replacements, the population will include specific part types of varying ages. Non-limiting examples of other spare part data that can be entered through spare parts list 100 include part manufacturer, part description, manufacturing assembly or part number, part category, part catalog number, lead time for delivery (days), set up quantity per machine, number of machines per plant, net target plant inventory quantity.

Under each column 102, 104 and 106, multiple rows of data can be input into the spare parts list 100, wherein each row relates to a single type of spare part population. In FIG. 3, spare parts list 100 includes first row 110, second row 112, third row 114, fourth row 116, fifth row 118 and nth row 120.

Having thus described the inputs for the estimation of life cycle costs and associated costs, the calculations used to transform all or part of the cost data inputs into costs estimations are thus described.

One cost estimation calculation specifically addressed by embodiments of the present invention is a cost estimation of spare parts needed over the life cycle of a machine. It should be appreciated that a manufacturing machine may include a number of replaceable parts, and during any given time interval, e.g. a life cycle, of the machine, each replaceable part is typically replaced with a suitable spare part at least once. Indeed, this cycle of replacing parts can be repeated a number of times during a machine's life cycle. It should also be appreciated that a machine may include several parts of the same type, which may need to be replaced at different times, thereby created a situation where the machine includes several parts of the same type with differing ages of service.

In at least one embodiment of the present invention, a process for calculating the number of spare parts needed during the life cycle of a machine is provided. In certain embodiments, this calculation includes the use of part failure distribution analysis. FIG. 4 is a flowchart 150 depicted the steps of such a calculation process. In block 152, the first step in the process is to receive spare parts input, which can be accomplished through spare parts list 100. In FIGS. 3 and 4, life data 106, which is relevant to the part failure distribution analysis, is input for each spare part population identified by item number.

According to at least one embodiment, the life data is Weibull life data and the failure distribution analysis is based on a Weibull model. The Weibull life data can include beta, eta and gamma, which can be input under columns 122, 124 and 126 of spare parts list 100 into spare part rows 110, 112, 114, 116, 118 and 120, wherein each row corresponds to a specific spare part population. Any or all of the Weibull life data can be used in the failure distribution analysis, which produces a failure distribution for each spare part population as a function of time. Beta refers to a shape parameter for defining the shape of the distribution. Eta is the scale parameter for defining where the bulk of the distribution lies. Eta is otherwise referred to as the characteristic life. Gamma is the location parameter for defining the location of the distribution in time. The specific values of beta, eta and gamma for any given replaceable part can be obtained through various sources known to those of ordinary skill in the art. For example, Weibuil++ or Weibull MT, available from ReliaSoft Corp. of Tuscon, Ariz., can be utilized to generate the life data values.

As depicted in block 154 of FIG. 4, the spares input, e.g. life data, is used for calculating the quantity of replacement parts needed for each replaceable part. It should be appreciated that the quantity of replacement parts needed is equivalent to the quantity of spare parts needed to perform these replacements. One approach for calculating the quantity of replacement parts needed involves the use of a statistical formula for generating a part failure distribution (block 156). For instance, a 3-parameter Weibull distribution can be generated using the following equation:

$$f(t) = \frac{\beta}{\eta}\left(\frac{t-\gamma}{\eta}\right)^{\beta-1} e^{-\left(\frac{t-\gamma}{\eta}\right)^{\beta}} \quad (1)$$

FIG. 5 represents an exemplary Weibull distribution 200 using equation (1). It should be appreciated that equation (1) yields the quantity of part failures (y-axis) as a function of time (x-axis). Applied to replaceable parts, this equation can be utilized to calculate the estimated quantity of replaceable parts that will fail during any given time period. The failure estimate provides the estimated replacement parts needed.

The following table shows how equation (1) is utilized to calculate the quantity of replacement parts needed during the life cycle of a machine. The following values and equations are used in Table 1:

$$t = \text{time} \quad (2)$$

$$\text{Starting Quantity of Replaceable Parts} = SQ = 100 \text{ parts} \quad (3)$$

$$\text{Machine Life Cycle} = MCL = 10 \text{ years} \quad (4)$$

$$\text{Survivors}(t) = S(t) = SQ - F(t) \quad (5)$$

$$\text{Failures}(t) = F(t) = S(t-1) - S(t) \quad (6)$$

TABLE 1

| (t) in yrs. | (S) | (F) |
| --- | --- | --- |
| 0 | 100 | 0 |
| 1 | 90 | 10 |
| 2 | 81 | 9 |
| 3 | 73 | 8 |
| 4 | 66 | 7 |
| 5 | 55 | 11 |
| 6 | 46 | 9 |
| 7 | 41 | 5 |
| 8 | 36 | 5 |
| 9 | 26 | 10 |
| 10 | 20 | 6 |

According to Table 1, the quantity of replacement s needed is provided as a function of time, i.e. years in the machine life cycle. Using this schedule, an enterprise can prepare an estimated budget of the quantity and cost of spare parts (with unit cost data) needed over the life cycle of the machine.

Block 158 of FIG. 4 depicts an alternative approach, referred to herein as a stepwise approach, for calculating the quantity of replacement parts. This approach accounts for the aging and failure of not only the calculating group of parts (covered by the formula approach), but also the aging and failure of replacement parts. Now, using Table 1, at the start of the second year, 10 replacement parts, which have replaced the 10 failed parts from year 1, are added to the survivor population of 90 from year 1. While the formula approach accounts for the aging and failure of the survivor population of 90, the stepwise approach accounts for aging and failure of the 10 first year replacement parts. Table 2 depicts the failure of first year replacement part. It should be appreciated that equations (5) and (6) can be used to calculate the S(t) and F(t) values.

TABLE 2

| | t(Y) | | | | | | | | | |
| --- | --- | --- | --- | --- | --- | --- | --- | --- | --- | --- |
| | 1 | 2 | 3 | 4 | 5 | 6 | 7 | 8 | 9 | 10 |
| S(t) | 10 | 9 | 8 | 7 | 6 | 5 | 5 | 4 | 3 | 3 |
| F(t) | 0 | 1 | 1 | 1 | 1 | 0 | 1 | 0 | 1 | 0 |

Applying the stepwise approach, the failures in the starting population and the replacement population at the end of year two are summed to calculate the total units replaced in year 2. Using Tables 1 and 2, the total units replaced equals 10, i.e. 9 replacements from the starting group and 1 replacement from the first year replacement part failures.

Accordingly, the stepwise approach then calculates the quantity of failures based on the 10 second year replacements (S(2)=10), as depicted in Table 3:

TABLE 3

| | Y | | | | | | | | | |
|---|---|---|---|---|---|---|---|---|---|---|
| | 1 | 2 | 3 | 4 | 5 | 6 | 7 | 8 | 9 | 10 |
| S(t) | | 10 | 9 | 8 | 7 | 6 | 5 | 5 | 4 | 3 |
| F(t) | | | 1 | 1 | 1 | 1 | 0 | 1 | 0 | 1 |

The failures in the starting population, the first year replacements, and the second year replacements at the end of year three are summed to calculate the total units replaced in year 3. Using Tables 1, 2 and 3, the total units replaced equals 10, i.e. 8 replacements from the starting group, 1 replacement from the first year replacement part failures, and 1 replacement from the second year replacement part failure.

This analysis is further carried out through the life cycle of the machine, as depicted in Table 4.

TABLE 4

| Failures From: | Year | | | | | | | | | |
|---|---|---|---|---|---|---|---|---|---|---|
| | 1 | 2 | 3 | 4 | 5 | 6 | 7 | 8 | 9 | 10 |
| Initial Group | 10 | 9 | 8 | 7 | 11 | 9 | 5 | 5 | 10 | 6 |
| Year 1 replacements | | 1 | 1 | 1 | 1 | 0 | 1 | 0 | 1 | 0 |
| Year 2 replacements | | | 1 | 1 | 1 | 1 | 0 | 1 | 0 | 1 |
| Year 3 replacements | | | | 1 | 1 | 1 | 1 | 0 | 1 | 0 |
| Year 4 replacements | | | | | 1 | 1 | 1 | 1 | 0 | 1 |
| Year 5 replacements | | | | | | 1 | 1 | 1 | 1 | 0 |
| Year 6 replacements | | | | | | | 1 | 1 | 1 | 1 |
| Year 7 replacements | | | | | | | | 1 | 1 | 1 |
| Year 8 replacements | | | | | | | | | 1 | 1 |
| Year 9 replacements | | | | | | | | | | 1 |
| Total Failures: | 10 | 10 | 10 | 10 | 15 | 13 | 10 | 10 | 16 | 7 |

The total failures for any given year equals the estimated quantity of replacement parts needed for that year.

As depicted in block 160 of FIG. 4, the quantity of estimated replacement parts is multiplied by the unit price for the spare part. The resulting value is the spare parts costs estimate, which can be made for the entire machine life cycle or can be broken down for any time period, e.g. yearly.

The steps of FIG. 4 can be repeated for each row of the spare part list 100, which corresponds to a specific spare part population. The spare part costs estimates for each row can be summed to obtain a total spare parts cost estimate.

In certain embodiments, the quantity of estimated replacement parts and the spare parts cost estimates can be output into the corresponding spare part item row on the spare parts list 100. This output can be generated per period, e.g. yearly, or as in total. Each row of the spare parts list 100 can also include reordering information based on the estimated replacement parts needed.

While at least one embodiment utilizes the 3-parameter Weibull distribution as a step in the process of calculating spare part costs, other distribution can be used in accordance with the present invention, for example 2-parameter Weibull, 1-parameter Weibull, exponential, normal (Guassian), log normal, logistic, loglogistic, Gumbel, Weibull-Bayesian or gamma distributions can be utilized.

The spare parts cost estimates calculated above can be plugged into an overall life cycle costs estimate model. The other components of life cycle costs can be calculated by using at least some of the cost data 50 and cost estimation formulas known to one of ordinary skill in the art. Accordingly, a life cycles cost estimate sheet can be generated. FIG. 6 depicts a fragment of a ten (10) year life cycle cost estimate sheet 250 for a machine. It should be appreciated that the ten (10) year model is one that is commonly used for machine tools since it may represent the typical time of use for a set of equipment before switching to new equipment. However, the model can have a lifetime in the range of 5 to 25 years depending on the machine being studied. For example, heavy machinery, which is not replaced as often, may be on the high end of this range, and hand held tools may be on the low end of the range. The sheet 250 includes sections for acquisition costs 252, operating costs 254, maintenance costs 256, turnover/scrap costs 258 and total cost 260. Each cost section can include a value per time period, e.g. yearly and a total for the entire lifetime of the machine. Advantageously, the spare parts line item 262 can contain values computed using the failure distribution approach provided by at least one embodiment of the present invention.

The spare parts cost estimates can also be plugged into a overhead budget estimate. The other components of the overhead budget estimate can be calculated using at least some of the cost data 50 and budget estimation formulas known to one of ordinary skill in the art. Accordingly, an overhead budget estimate sheet can be generated. FIG. 7 depicts a fragment of a ten (10) year overhead budget estimate sheet 300 for a machine. The sheet includes a tooling line 302, maintenance materials line 304, supplies line 306, scrap line 308, utilities and fuels line 310, sundry line 312, provisions line 314, and total line 316. An operating cost for each line for each year in the life of the machine can be entered in fields 318. For example, field 320 corresponds to the operating costs for scrap 320 for year 2. Advantageously, the values in maintenance material line 304 can include values computed using the failure distribution approach provided by at least one embodiment of the present invention.

As required, detailed embodiments of the present invention are disclosed herein. However, it is to be understood that the disclosed embodiments are merely exemplary of the invention that may be embodied in various and alternative forms. Therefore, specific functional details described herein are not to be interpreted as limiting, but merely as a representative basis for the claims and/or as a representative basis for teaching one of ordinary skill in the art to variously employ the present invention.

While the best mode for carrying out the invention has been described in detail, those familiar with the art to which this invention relates will recognize various alternative designs and embodiments for practicing the invention as defined by the following claims.

What is claimed:

1. An electronic method for estimating a quantity of spare parts needed for a machine, wherein the machine includes a number of replaceable part populations, the method comprising:
   (a) receiving (i) life data for a number of part populations of a machine, wherein each of the number of part populations has a corresponding spare part for replacement and (ii) a duration for the life cycle of the machine;
   (b) calculating a failure distribution according to a failure distribution model for each of the number of part populations based on the life data;
   (c) calculating an estimated replacement part quantity for each of the number of part populations for one or more time intervals in the duration based on the failure distribution;
   (d) receiving (iii) a unit price for each of the corresponding spare parts;
   (e) calculating an estimated spare parts cost for one or more time intervals in the duration based on the estimated replacement part quantities and the unit price for the corresponding spare part for each of the number of part populations; and
   (f) before the beginning of the duration of the life cycle of the machine, preparing an estimated budget report of the quantity and cost of each of the corresponding spare parts based on the estimated spare parts cost calculated in step (e),
   wherein the failure distribution model is a Weibull model and the life data includes a shape parameter (beta) for defining the shape of the failure distribution, a scale parameter for defining the mean of the failure distribution (eta) and a location parameter for defining a location of the failure distribution in time (gamma).

2. The method of claim 1, wherein the Weibull model is selected from the group consisting of: one-parameter, two-parameter, and three-parameter Weibull models.

3. The method of claim 1, wherein the Weibull model is selected from the group consisting of: exponential, logarithmic, lognormal and normal.

4. The method of claim 1, wherein the Weibull model is a formula Weibull model.

5. The method of claim 1, wherein the Weibull model is a stepwise Weibull model.

6. An electronic method for estimating life cycle costs of a machine, wherein the machine includes a number of replaceable part populations, the method comprising:
   (a) receiving (i) life data for a number of part populations of a machine, wherein each of the number of part populations has a corresponding spare part for replacement, (ii) a unit price for each of the corresponding spare parts; and (iii) a duration for the life cycle of the machine;
   (b) calculating a failure distribution for each of the number of part populations based on the life data;
   (c) calculating an estimated replacement part quantity for each of the number of part populations for one or more intervals in the duration based on the failure distribution;
   (d) calculating an estimated spare parts cost for the one or more intervals in the duration based on the estimated replacement part quantities and the unit price for the corresponding spare part for each of the number of part populations;
   (e) calculating an estimated life cycle costs for the machine based partially on the estimated spare parts cost; and
   (f) before the beginning of the duration of the life cycle of the machine, preparing an estimated budget report of the quantity and cost of each of the corresponding spare parts based on the estimated life cycle costs calculated in step (e),
   wherein the failure distribution model is a Weibull model and the life data includes a shape parameter (beta) for defining the shape of the failure distribution, a scale parameter for defining the mean of the failure distribution (eta) and a location parameter for defining a location of the failure distribution in time (gamma).

7. The method of claim 6, further comprising (g) calculating an overhead budget estimation based partially on the estimated spare parts costs.

8. The method of claim 6, wherein the Weibull model is a formula Weibull model.

9. The method of claim 6, wherein the Weibull model is a stepwise Weibull model.

10. A computer system comprising:
    a computer having a central processing unit (CPU) for executing machine instructions and a memory for storing machine instructions that are to be executed by the CPU, the machine instructions when executed by the CPU implement the following functions:
    (a) receiving (i) life data for a number of part populations of a machine, wherein each of the number of part populations has a corresponding spare part for replacement, (ii) a unit price for each of the corresponding spare parts; and (iii) a duration for the life cycle of the machine;
    (b) calculating a failure distribution according to a failure distribution model for each of the number of part populations based on the life data;
    (c) calculating an estimated replacement part quantity for each of the number of part populations for one or more time intervals in the duration based on the failure distribution;
    (d) calculating an estimated spare parts costs for one or more intervals in the duration based on the estimated replacement part quantities and the unit price for the corresponding spare part for each of the number of part populations; and
    (e) before the beginning of the duration of the life cycle of the machine, preparing an estimated budget report of the quantity and cost of each of the corresponding spare parts based on the estimated parts costs calculated in step (d),
    wherein the failure distribution model is a Weibull model and the life data includes a shape parameter (beta) for defining the shape of the failure distribution, a scale parameter for defining the mean of the failure distribution (eta) and a location parameter for defining a location of the failure distribution in time (gamma).

11. The system of claim 10, wherein the Weibull model is selected from the group consisting of: one-parameter, two-parameter, and three-parameter Weibull models.

12. The system of claim 10, wherein the Weibull model is selected from the group consisting of: exponential, logarithmic, lognormal and normal distributions.

13. The system of claim 10, wherein the Weibull model is a formula Weibull model.

14. The system of claim 10, wherein the Weibull model is a stepwise Weibull model.

15. The method of claim 6, wherein the Weibull model is selected from the group consisting of: exponential, logarithmic, lognormal and normal distributions.

* * * * *